United States Patent
Bradski

(10) Patent No.: US 7,272,583 B2
(45) Date of Patent: Sep. 18, 2007

(54) USING SUPERVISED CLASSIFIERS WITH UNSUPERVISED DATA

(75) Inventor: Gary R. Bradski, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 11/005,136

(22) Filed: Dec. 6, 2004

(65) Prior Publication Data

US 2006/0179021 A1 Aug. 10, 2006

(51) Int. Cl.
*G06F 15/18* (2006.01)
(52) U.S. Cl. .................................................. 706/12
(58) Field of Classification Search ............... 706/12
See application file for complete search history.

(56) References Cited

U.S. PATENT DOCUMENTS

| | | | | |
|---|---|---|---|---|
| 5,675,710 A | * | 10/1997 | Lewis | ......................... 706/12 |
| 6,363,160 B1 | | 3/2002 | Bradski et al. | ............. 382/103 |
| 6,394,557 B2 | | 5/2002 | Bradski | ....................... 302/103 |

OTHER PUBLICATIONS

Andrew W. Moore "K-means and Hierarchical Clustering" www.cs.cmu.edu. Nov. 16, 2001.

D. Comaniciu and P. Meer, "Distribution free decomposition of multivariate data", Pattern Analysis & Applications. vol. 2. pp. 22-30. 1999.

Wald, Lecture II, "Looking inside the Black Box", Leo Breiman, http://stat-www.berkeley.edu/users/breiman/wasI2002-2.pdf. pp. 19-35. Feb. 2002.

Andrew Y. Ng, Michael I. Jordan, Yair Weiss. "On Special Clustering: Analysis and an algorithm". 2001.

E.M. Kleinberg, "On the algorithmic implementation of stochastic discrimination", IEE Transactions on Pattern Analysis and Machine Intelligence, PAMI-22, May 5, 2000, Abstract.

Dechang Chen, Peng Huang and Xiuzhen Cheng. "A concrete statistical realization of Kleinberg's stochastic discrimination for pattern recognition. Part I. Two-class classification" Source: Ann. Statistic. 31 (2003), No. 5. Abstract.

* cited by examiner

*Primary Examiner*—Joseph P Hirl
*Assistant Examiner*—Michael B. Holmes
(74) *Attorney, Agent, or Firm*—Trop, Pruner & Hu, P.C.

(57) ABSTRACT

In one embodiment, a method includes converting unsupervised data into supervised data using multiple processes and training multiple supervised classifiers with the supervised data of the processes. In such manner, supervised classifiers may be used to classify unsupervised data. Affinity measures may be determined and data clustered using the resulting trained classifiers. Other embodiments are described and claimed.

20 Claims, 5 Drawing Sheets

USING SUPERVISED CLASSIFIERS WITH UNSUPERVISED DATA

BACKGROUND

This invention relates generally to data mining.

Data mining involves the statistical analysis of complex data. In one application, data mining technology may be utilized to implement machine learning. Generally, data mining may be used to learn from data. Data features enable predictions to be made. A training set of data may be observed to find the combination and weighting of those features that are determinative of data outcomes of interest. A predictive model is developed to predict a corresponding outcome based on the previously found combination and weighting of features as they appear in new data.

A data set may include a collection of data points, each of which has a set of features. Supervised data contains labels or predictors. That is, a data set may contain a collection of features and a label or predictor for those features. As an example, a data set may include a collection of features about mushrooms, such as cap type, color, texture, and so on, and a label such as edible, poisonous, medicinal, and so on, or a predictor, such as a numeral value representing the toxicity of a mushroom. Unsupervised data lacks such a label or predictor. That is, an unsupervised data set may include a collection of features without a label or predictor.

A supervised classifier takes as an input the data point features and is trained on and learns to associate the label or predictor of that data point. In a test mode, where only the features of a data point are available, the classifier attempts to produce the correct label or predictor for the data point.

Tree based classifiers make sequential decisions on a selected feature at each branch point in order to arrive at a final label or prediction at the leaves of a tree. A classifier may be used to decide which data points meet a given criteria. At each branch point, data points are sorted into their appropriate branch according to how they meet the criterion. This classification proceeds downwardly from a root or starting point to leaves or ending points. A forest consists of many trees, each of which gives a weighted vote for the label or prediction value.

A kernel uses a radial kernel, such as a Gaussian kernel, to measure distances between data points and kernel centers. Kernel methods achieve localization using a weighting function of each kernel that assigns a weight to a data point based on its distance from each kernel center.

Nearest neighbor classifiers associate a label or predictor of a new point with that of its nearest neighboring points. Classification is based on the majority vote of those nearest neighbors.

In contrast to supervised classifiers, unsupervised classifiers are less well developed and require significant effort to obtain a desirable classification or meaningful data clusters. Examples of unsupervised classifiers include different clustering techniques, such as spectral clustering and agglomerative or hierarchical clustering. Spectral clustering takes an affinity matrix A of data points and performs singular value decomposition. The large singular values in the decomposition are calculated to indicate eigenvalues that correspond to clusters of data. Hierarchical filtering takes data points and builds a tree of affinity or proximity by linking the nearest points together on up through the tree until all data points are in a single cluster.

However, various problems exist with respect to these unsupervised classifiers. For example, it must be determined ahead of time how many clusters are desired. However, without a priori knowledge of the data set, it is difficult to accurately determine a number of clusters. Furthermore, depending upon the number of clusters present, different clusterings can occur, leading to less meaningful data clusters.

A need thus exists to more effectively analyze unsupervised data.

DETAILED DESCRIPTION

Figure 1:
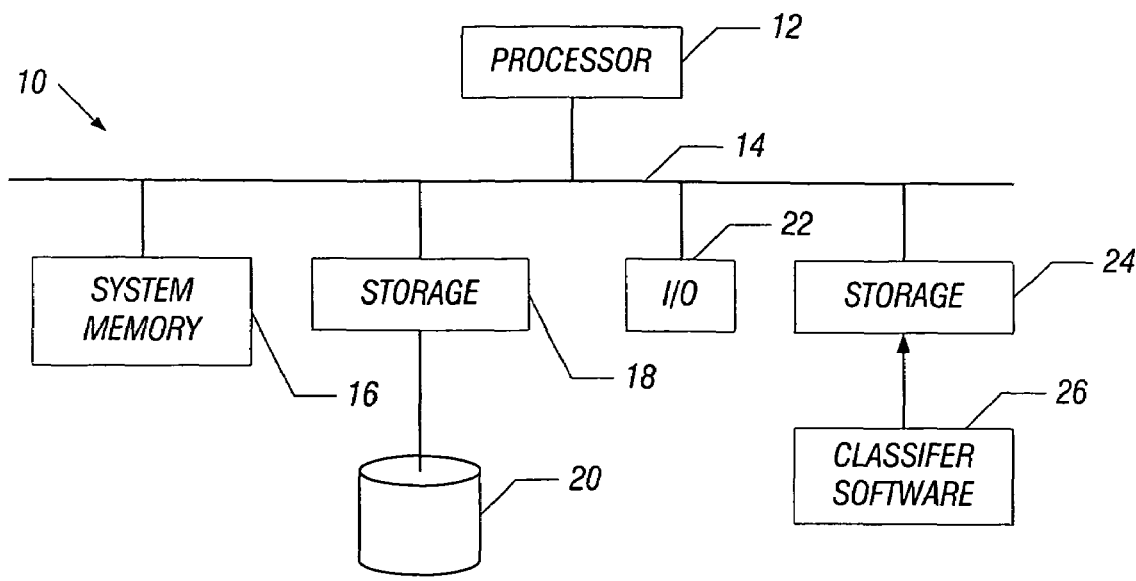
FIG. 1 is a schematic depiction of a computer system in accordance with one embodiment of the present invention.

Referring to FIG. 1, a computer system 10 may include a processor 12 coupled to a bus 14. The system 10 is only an example and the scope of the present invention is not limited to any particular architecture. In a simple example, the bus 14 may be coupled to a system memory 16 (which in one embodiment may be a dynamic random access memory (DRAM)), a storage 18, an input/output (I/O) device 22, and another storage 24. The storage 24 may store various software, including software 26, which may include multiple classification programs in accordance with an embodiment of the present invention. In various embodiments, software 26 may be loaded into system memory 16 prior to execution for faster operation. Of course, multiple software programs may be present. Data to be classified may be stored in a database 20 associated with storage 18.

As discussed, system 10 is representative and other systems may include more or different components, and such components may be differently arranged. For example, instead of the architecture of FIG. 1, a system may have a hub-based architecture, with a memory controller hub (MCH) coupled between processor 12 and system memory 16, and an I/O controller hub (ICH) coupled between the MCH and I/O devices, such as I/O device 22.

In various embodiments, unsupervised data may be converted into supervised data. Then one or more supervised classifiers may be trained and used to classify the converted data. For example, affinity measures for the data points may be determined using the trained classifiers. Then, the data may be clustered and/or visualized according to the affinity measures. In some embodiments, multiple supervised classifiers may be used to classify converted data. Then, based upon either a type of the data or the cluster results, one of the trained supervised classifiers may be selected as the final choice for clustering and analysis.

Figure 2:
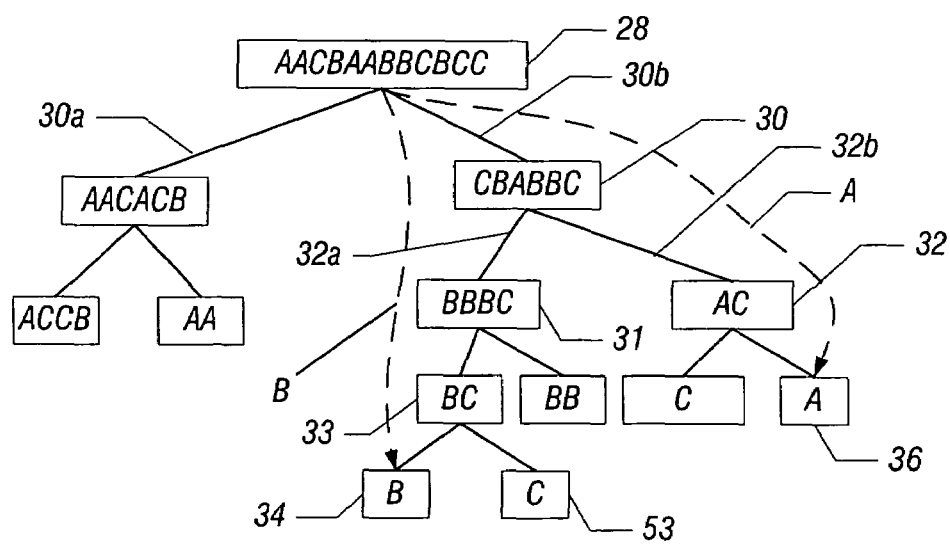
FIG. 2 illustrates a binary decision tree supervised classifier in accordance with one embodiment of the present invention.

Any supervised classifier that can produce an affinity measure may be used to classify converted data. For example, in one embodiment a tree-based classifier may be used. Referring to FIG. 2, a tree-based classifier includes a root 28 and branches indicated at 30 and 32. Thus, a root data set 28 may be progressively classified into branches using a decision criterion. At each decision or branching point, the decision criterion is applied. The most common decision criterion is to find a function of the features that best separates the data into like groups, each group of which is then assigned to follow its corresponding branch at that point. The tree based classifier enables one to select or distinguish between data. For example, some data may have features that may be more relevant or more pertinent than other data. The data's relevancy may be specified by a classifier that enables the data to be assessed.

Generally, a tree based classifier may use multiple branches at each branching point. Most commonly and to be concrete, we discuss a binary decision tree below where there can only be two choices at each branch point: follow the "left" branch or follow the "right" branch. By our convention, call the left branches 30a, 32a of the tree the "yes" branches and the right branches 30b, 32b of the tree the "no" branches. That is, data with features that meet the classification criteria are placed in the left branch and data that does not meet those criteria are placed in the right branch. The classification criteria (which is not shown in FIG. 2) is applied at the branching point between branches.

Thus, the initial data set AACBAABBCBCC at the root 28 may be subjected to a tree based classification. By our convention here, the repeats of the data points "A", "B" and "C" are meant to represent different data that share strong relationships with each other in their respective groups. The data (AACACB) that satisfies a first classifier is put into the left branch 30a, while the data (CBABBC) that does not satisfy the classifier is put into the right branch 30b. In this way, the data can be uniquely classified in a relatively easily visualized format. Other branches are shown at 31 and 33.

Once a tree has been formed, an affinity measure may be developed between two data points, such as points A and B in FIG. 2. An affinity measure may be bounded between total affinity (one) and no affinity (zero). The affinity measure quantifies the degree of relatedness of two data points, as determined by the selected classifier.

In order to determine affinity between two data points A and B, the points are fed into the root 28 of the tree and are subjected to a tree based classification until the data points ultimately classify into the same leaf or two different leaves. In the case illustrated in FIG. 2, the data point A ends up in the leaf 36. The data point B ends up in the leaf 34.

While the above discussion of tree-based classifiers with regard to FIG. 2 is shown for illustrative purposes only, it is to be understood that in various embodiments, different supervised classifiers may be used in connection with converted data. Such supervised classifiers may include, for example, forests, nearest neighbor, or kernels.

Figure 3:
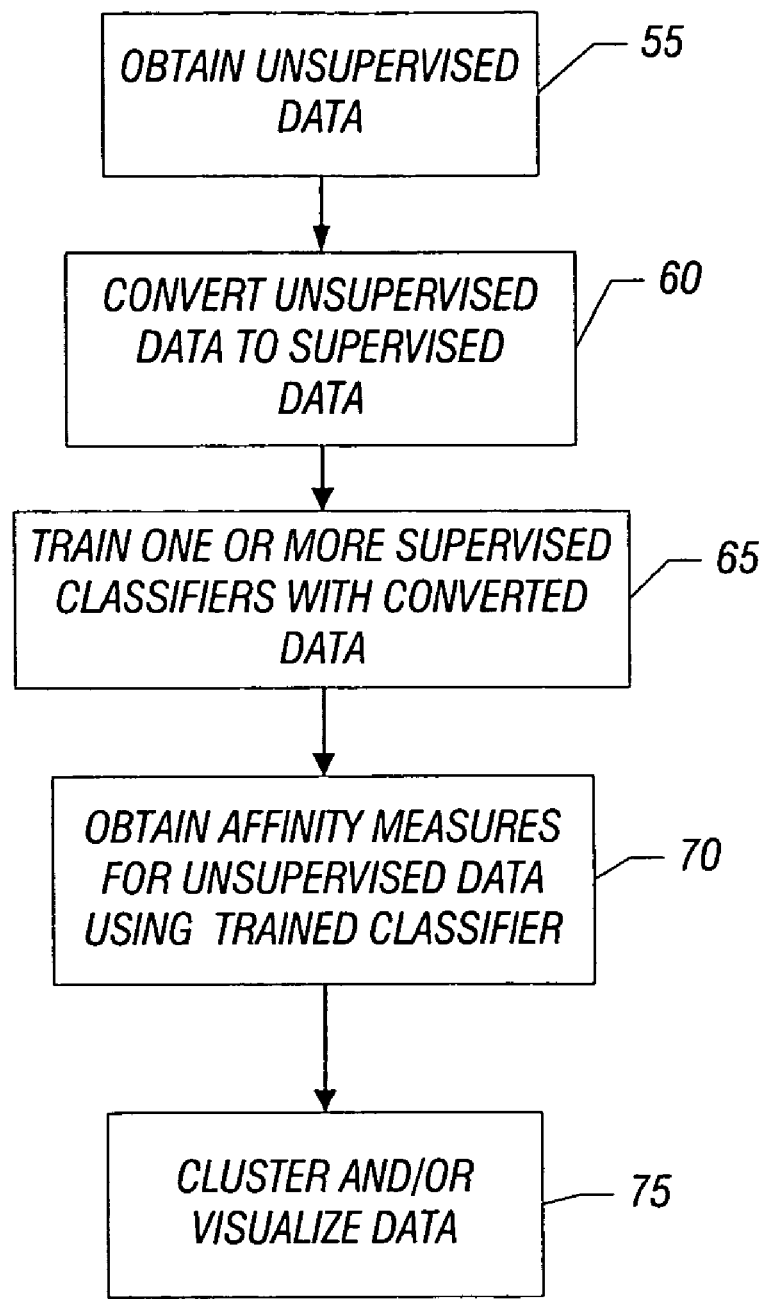
FIG. 3 is a flow diagram of a method in accordance with one embodiment of the present invention.

Referring now to FIG. 3, shown is a flow diagram of a method in accordance with one embodiment of the present invention. As shown in FIG. 3, method 50 may be used to cluster unsupervised data using one or more supervised classifiers. As shown in FIG. 3, method 50 may begin by obtaining unsupervised data (block 55). For example, unsupervised data may be obtained from sensors, data mining sources, or in any other way. Next, the unsupervised data may be converted to supervised data (block 60). Different methods of converting such data will be discussed further below. In some embodiments, multiple methods of converting the unsupervised data may be performed.

One or more supervised classifiers may then be trained with the converted data (block 65). For example, different classifiers, such as tree-based classifiers, kernels or nearest neighbor classifiers may be used. In embodiments where unsupervised data is converted using different methods, the multiple supervised classifiers may all be of the same type. For example, a tree-based classifier may be used to classify data converted by different methods. Affinity measures may be obtained for the unsupervised data using the trained classifiers (block 70). Based on these affinity measures, the data may be clustered and/or visualized (block 75).

Figure 4:
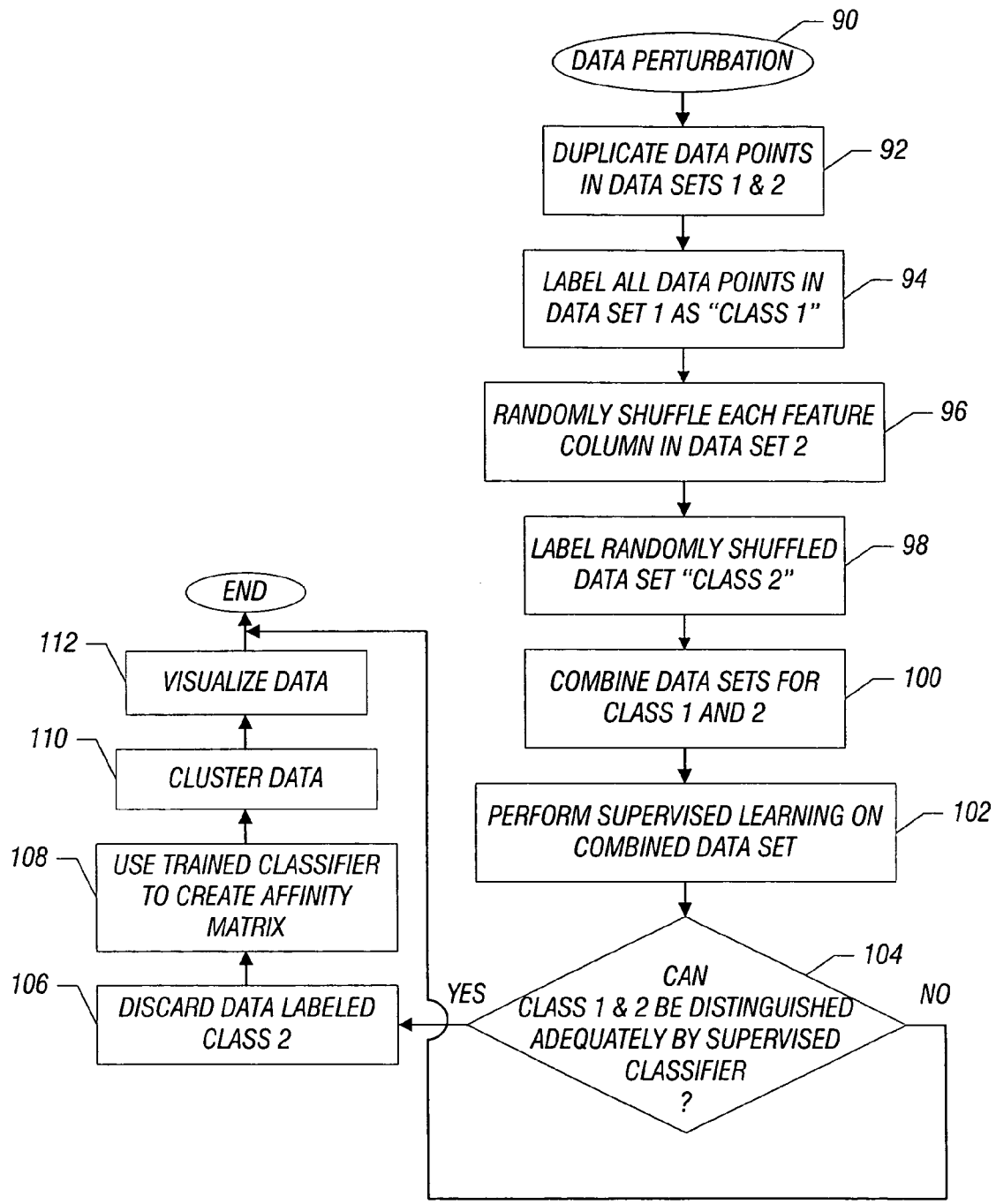
FIG. 4 is a flow diagram of a data perturbation method in accordance with one embodiment of the present invention.

Referring now to FIG. 4, shown is a flow diagram of a method in accordance with one embodiment of the present invention. More specifically, FIG. 4 shows a method 90 for performing data perturbation to cluster unsupervised data points.

As shown in FIG. 4, the method, which may be a software routine that may be stored in storage 26 of FIG. 1, for example, begins at oval 90. Data points, which may be unsupervised data points, are duplicated into two sets, namely a data set 1 and a data set 2 (block 92). All the data points in data set 1 may be labeled as "class 1" (block 94). Next, each feature column in data set 2 is randomly shuffled (block 96). For example, in one embodiment, each feature column in turn may have its members randomly shuffled. In such manner, any structure present in the data set (if any) is destroyed. The randomly shuffled data set may be labeled "class 2" (block 98).

After perturbing the data as described above, the data sets for "class 1" and "class 2" may be combined (block 100). The data sets may be combined by alternating data points of the first set and second set, for example.

Next, a supervised classifier may perform supervised learning on the combined data set (block 102). By creating two classes, the supervised classifier thus performs learning on a two-class problem. In one embodiment, a portion of the data points may be held back for cross-validation/testing purposes. For example, 90% of the data points may be used to train the classifier, and the remaining 10% used to test the trained classifier. As such, supervised learning may be used to train the supervised classifier to learn to tell the two classes apart.

In other embodiments, one may perform feature selection by feature column perturbation or other such methods. Then, supervised learning may be re-run to reduce the set of features that are to be learned. Features may be eliminated and new training may be retained if: perturbing the feature had little effect on performance (in other words, the feature has weak dependency); or removing the feature and re-training increases performance.

Still referring to FIG. 4, next it is determined whether "class 1" and "class 2" can be adequately distinguished by the supervised classifier (diamond 104). For example, it may be determined whether the supervised classifier can distinguish the classes to a desired level of accuracy. Such a desired level of accuracy may be determined by a user. For example, in one embodiment, a desired level of accuracy may be approximately 75%, although the scope of the present invention is not so limited.

If the supervised classifier can distinguish the classes as set forth in diamond 104, control passes to block 106. Alternately, the method may terminate. At block 106, the data labeled "class 2" may be discarded. Next, the trained classifier may be used to create an affinity matrix of the data points (block 108). Such data points may be the original data points. Next, the data may be clustered (block 110). For example, in one embodiment spectral clustering may be performed to cluster the data. Alternately, agglomerative clustering may be used. In some embodiments, the data may be visualized (block 112). For example, one may visualize the data by plotting it in a two dimensional (2D) point-to-point affinity plot.

Figure 5:
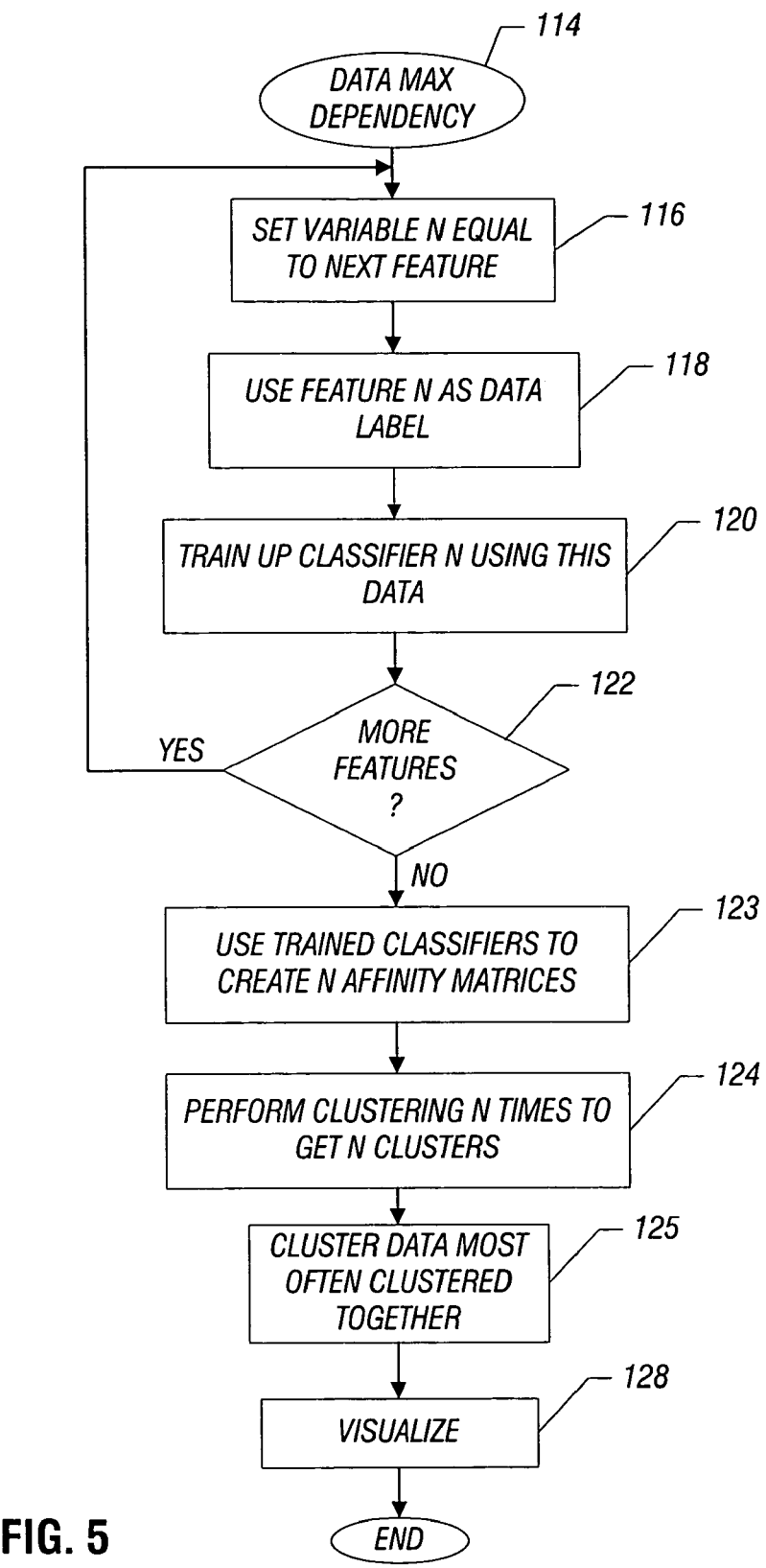
FIG. 5 is a flow diagram of a first data dependency method in accordance with one embodiment of the present invention.

Referring now to FIG. 5, shown is a flow diagram of a method in accordance with another embodiment of the present invention. In the embodiment of FIG. 5, a data maximum (max) dependency method is used to convert unsupervised data to supervised data, and may be a software routine (e.g., stored in storage 26 of FIG. 1) that begins at oval 114.

At block 116, a variable N is set equal to a next feature of the data set, where there are one to N features within the data set. Feature N is then used as the data label (block 118). A supervised classifier for feature N may be trained using the data (block 120). As discussed above, any type of supervised classifier may be used. Some data points may be held back and used to test the trained classifier. After training a classifier with feature N as the label, next it may be determined whether more features are present in the data set (diamond 122). If so, control returns to block 116. Thus, N classifiers (which may all be the same type of classifier) are trained, each one corresponding to one of the N features of the data set.

If no further features are present as determined at diamond 122, control passes to block 123. There, the trained classifiers may be used to create affinity matrices (block 123). For N trained classifiers, N affinity matrices may be formed. Then, clustering may be performed to obtain desired clusters of the data (block 124). For example, spectral clustering may be performed N times to get N clusterings of the data. Alternately, agglomerative clustering may be used.

Data may be clustered based on the results of the multiple clustering runs. For example, two data points may be clustered together if they were clustered together the most in the N separate clustering runs (block 125). In one embodiment, each pair of data may be analyzed and a count may be generated to indicate how often the pair is clustered together in the N clusterings. For each data pair, the pair with the maximal count of clusterings together may be placed together, and their count crossed off. Such counting and clusterings may be performed for each data point. Finally, the data may be visualized (block 128).

Figure 6:
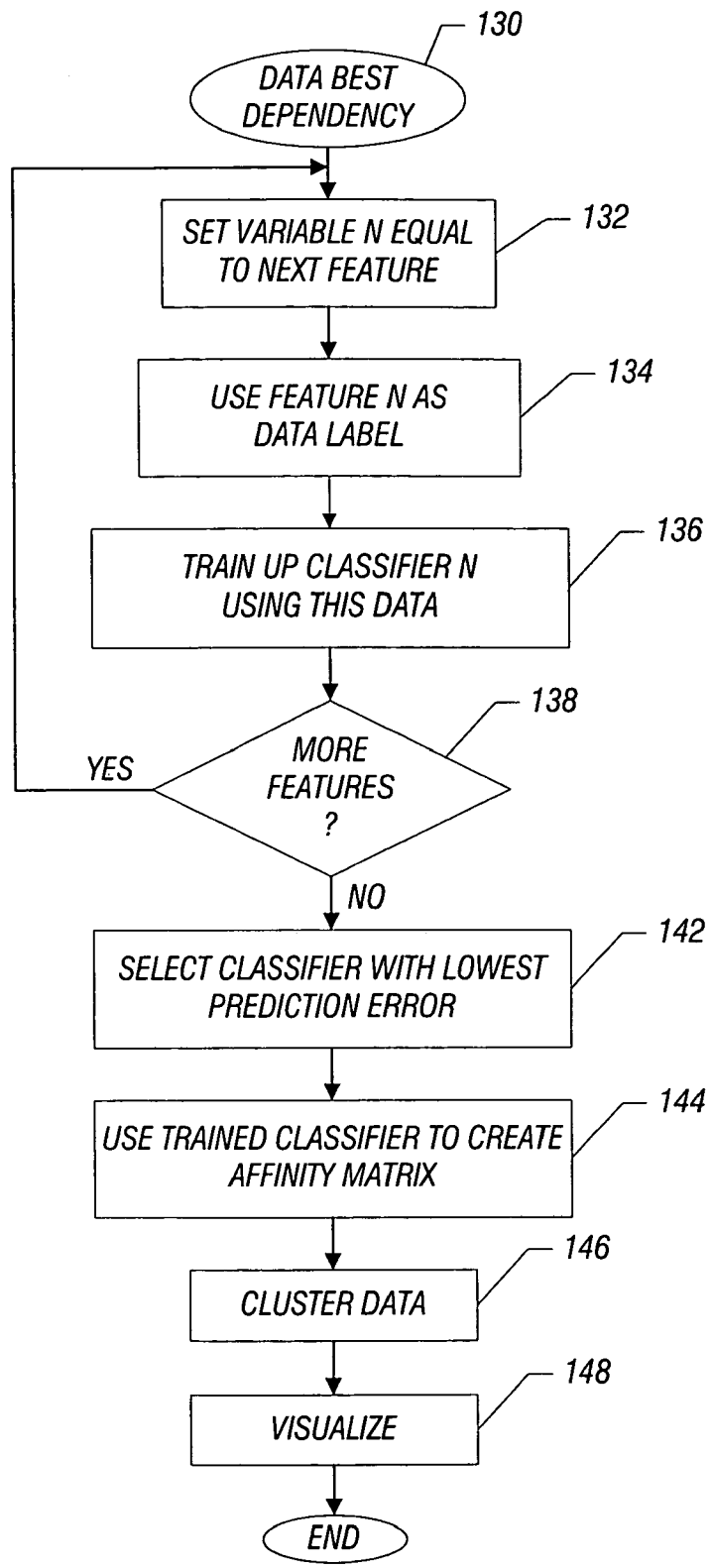
FIG. 6 is a flow diagram of a second data dependency method in accordance with another embodiment of the present invention.

Referring now to FIG. 6, shown is a flow diagram of a method in accordance with yet another embodiment of the present invention. As shown in FIG. 6, a data best dependency method for converting unsupervised data may be implemented as a software routine (e.g., stored in storage 26 of FIG. 1) and may begin at oval 130. A variable N may be set equal to a next feature of a data set, where the data set may have a number of features from one to N (block 132). In turn, each feature N is used as a data label (block 134). Next, a supervised classifier N may be trained up using the data (block 136). It may then be determined whether additional features are present in the data set (diamond 138). If so, control returns to block 132. Thus, N classifiers are trained, each one corresponding to one of the N features of the data set.

If instead no more features are present (as determined at diamond 138), control passes to block 142, where the classifier with the lowest prediction error is selected. Using the selected trained classifier, an affinity matrix is created (block 144). Then, the data is clustered (block 146). As examples, spectral clustering or agglomerative clustering may be used to appropriately cluster the data. In some embodiments, the data then may be visualized (block 148). For example, the data may be visualized by plotting it in a 2D point-to-point affinity plot.

Any of the methods described above with regard to the flow charts of FIGS. 4, 5 and 6 may be used to take unsupervised data and convert it into supervised data. After training, supervised classifiers may be used to determine affinity measures. However, depending upon the nature of the data, one such conversion method may be preferable to other methods. For example, if one does not know the nature of the unlabeled data, data perturbation, such as that described above with regard to FIG. 4, may be the best method for converting the unsupervised data. If instead one knows that there are many strong dependencies within the unlabeled data, data max dependency, as described above in FIG. 5 may be the best method for converting the unsupervised data. For example, where there are thick dependencies between the features, data max dependency may be the best method. If instead one knows that some dependencies are much stronger than others within the data set, data best dependency as described above with regard to FIG. 6 may be the best method for converting the unsupervised data. For example, where a single feature stands out, date best dependency may be the best method.

In one embodiment, data perturbation may be first performed. If a cross-validation test on the trained classifier indicates high predictability, data perturbation may be the most appropriate method. In other embodiments, a data perturbation method may be first run to determine the type of features present in the data set. Then, based upon the results of the clustering using data perturbation, one or another of the methods may be the most appropriate.

In another embodiment, multiple methods of converting unsupervised data may be used, and different supervised classifiers may be trained for each of the methods (the classifiers for each of the methods may be the same type, or may be different types). Then, a final result may be determined by analyzing the results of the different methods. For example, all three methods described above may be performed to manipulate unsupervised data and cluster it accordingly. Then, the result that provides the best clustering may be selected as the final clustering for the unsupervised data. For example, if none of the features stand out strongly, data max dependency may be the most appropriate method. If one or multiple features are strongly predictive of the outcome, either data perturbation or data best dependency may be the most appropriate method.

Embodiments may be implemented in a computer program that may be stored on a storage medium having instructions to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    converting unsupervised data stored in a system and obtained from a sensor into supervised data using a plurality of processes corresponding to a data perturbation process and at least one data dependency process;
    training each of a plurality of supervised classifiers with the supervised data of one of the plurality of processes;
    determining affinity measures for the supervised data using the plurality of supervised classifiers; and
    visualizing the supervised data based on the affinity measures by plotting the supervised data in an affinity plot on a display of the system.

2. The method of claim 1, further comprising clustering the supervised data based on the affinity measures.

3. The method of claim 1, wherein converting the unsupervised data comprises performing a data dependency on the unsupervised data.

4. The method of claim 3, further comprising iteratively selecting a feature of the unsupervised data as a selected label and training one of the plurality of supervised classifiers to obtain a plurality of trained supervised classifiers.

5. The method of claim 4, further comprising selecting the one of the plurality of the trained supervised classifiers having a lowest prediction error.

6. The method of claim 1, wherein the plurality of supervised classifiers are of a same classifier type.

7. The method of claim 1, further comprising separately clustering the supervised data of each of the plurality of processes.

8. The method of claim 7, further comprising selecting one of the separately clustered supervised data based on results of the separate clustering.

9. The method of claim 7, further comprising selecting one of the plurality of processes for a final clustering based on a nature of the unsupervised data.

10. A method comprising:
    duplicating an unsupervised data set into a first class and a second class of a supervised data set;
    training a supervised classifier using the supervised data set;
    determining an affinity matrix using the trained supervised classifier; and
    clustering the unsupervised data using the affinity matrix and displaying the clustered unsupervised data as an affinity plot on a display.

11. The method of claim 10, further comprising performing data perturbation on the second class of the supervised data set.

12. The method of claim 11, further comprising randomly shuffling at least a portion of the second class.

13. An article comprising a machine readable storage medium containing instructions that when executed enable a system to:
    duplicate an unsupervised data set obtained from a data mining source into a first class and a second class of a supervised data set and combine the first and second class into a combined supervised data set;
    perform data perturbation on the second class of the supervised data set;
    train a supervised classifier using the combined supervised data set, wherein a portion of the combined supervised data set is retained to test the trained supervised classifier; and
    determine an affinity matrix of the unsupervised data set using the trained supervised classifier and display a two-dimensional point-to-point affinity plot of the unsupervised data set.

14. The article of claim 13, further comprising instructions that when executed enable the system to randomly shuffle at least a portion of the second class.

15. The article of claim 13, further comprising instructions that when executed enable the system to cluster the unsupervised data using the affinity matrix.

16. A system comprising:
    a processor to execute instructions; and
    a dynamic random access memory containing instructions that when executed enable the system to convert unsupervised data stored in the system and obtained from a sensor into supervised data using a plurality of processes, train each of a plurality of supervised classifiers with the supervised data of one of the plurality of processes, determine affinity measures for the supervised data using the plurality of supervised classifiers, and visualize the supervised data based on the affinity measures by a plot of the supervised data in an affinity plot on a display of the system.

17. The system of claim 16, further comprising instructions that if executed enable the system to iteratively select a feature of the unsupervised data as a selected label and train one of the plurality of supervised classifiers to obtain a plurality of trained supervised classifiers.

18. The system of claim 17, further comprising instructions that if executed enable the system to select the one of the plurality of the trained supervised classifiers having a lowest prediction error.

19. The system of claim 16, further comprising instructions that if executed enable the system to separately cluster the supervised data of each of the plurality of processes.

20. The system of claim 19, further comprising instructions that if executed enable the system to select one of the plurality of processes for a final clustering based on a nature of the unsupervised data.

* * * * *